Patented May 5, 1953

2,637,654

UNITED STATES PATENT OFFICE 2,637,654

EGG WHITE COMPOSITION

Herbert J. Kothe, Bronx, N. Y., assignor to Standard Brands Incorporated, New York, N. Y., a corporation of Delaware No Drawing. Application February 8, 1950,
Serial No. 143,143

8 Claims. (Cl. 99—113)

This invention relates to a process for the treatment of egg substance, particularly egg white, to improve its whipping properties, and to the resulting product.

It has been found that egg whites can be whipped to a good foam in a shorter time if they are mixed with a small amount of an edible unsulfonated ester of an aliphatic alcohol and an aliphatic polybasic acid, said ester being appreciably soluble in water, that is, soluble to the extent of at least 0.01%. Preferably, both the alcohol and acid components are also appreciably soluble in water. The acid component may be fully or only partially esterified and the ester may be a mixed ester, i. e., one containing radicals derived from two or more different alcohols. Suitable esters are, for example, the methyl and ethyl esters of tartaric, malic, malonic, citric and succinic acids.

The concentration of the ester may be varied considerably and depends to some extent upon its constitution. In the case of triethyl citrate, for instance, the amount used is preferably between 0.01% and 0.05% by weight of the egg white. It does not appear to be any more effective at concentrations higher than 0.05%, while its effectiveness diminishes at concentrations below 0.01%.

In addition to shortening the whipping period the esters increase the overbeating tolerance of egg whites. When regular untreated egg whites are beaten too long they produce smaller cake volume than when they receive the correct or normal amount of beating. When the esters of this invention are added the egg whites will maintain high cake volume even though they are overbeaten. For instance, egg whites with triethyl citrate average more than 6% higher cake volume by comparison with overbeaten controls containing no esters.

The whipping properties of egg whites may be measured by determining the foam density or the specific foam volume at a given whipping time. The following table compares the foam densities at different fixed whipping times of egg whites containing 0.025% triethyl citrate by weight and a control containing no citrate.

| Whipping Time (min.) | Densities (gm./cc.) | |
|---|---|---|
| | Control | Triethyl Citrate |
| 1 | 0.140 | 0.093 |
| 3 | .108 | .085 |
| 5 | .095 | .078 |

In this test on a laboratory scale with 200 gram batches the whites containing triethyl citrate whipped to the same density (0.095) as the control in about one-fifth the time. After whipping for one minute the specific foam volume of the citrate sample was 10.7 cc. per gram, while that of the control was 7.1 cc. per gram.

The following table shows the effectiveness of 0.025% triethyl citrate in shortening whipping time and maintaining angel food cake volume in regular bakery tests using 1,000 gram batches. In this table normal beat signifies a foam density of 0.1149 gram per cc. and overbeat signifies a foam density of 0.0820 gram per cc.

| Sample | Type of Beat | Beating Time (Min.) | Cake Volume (ml.) |
|---|---|---|---|
| Control | Normal | 5 | 2,855 |
| | Overbeat | 10¾ | 2,330 |
| Triethyl Citrate | Normal | 3½ | 2,820 |
| | Overbeat | 7½ | 2,495 |

It is evident that the citrate sample whips up to a given volume 30% faster than the corresponding control sample. Moreover, in the case of the overbeaten citrate sample the cake volume is 7% higher than in the case of the overbeaten control.

The following table gives a comparison of the whipping times of egg whites containing various esters and the cake volumes obtained with overbeaten samples. In each case an ethyl ester was used in a concentration of 0.05% by weight. Normal beating and overbeating have the same significance as in the preceding table:

| Sample | Overbeating Time (Min.) | Cake Volume (ml.) | Percent Volume Increase over Control | Normal Beating Time (Min.) |
|---|---|---|---|---|
| Control | 10 | 2,545 | -------- | 6¼ |
| Diethyl-d-Tartrate | 9½ | 2,765 | 8.6 | 5¼ |
| Diethyl-Malate | 8½ | 2,815 | 10.6 | 4 |
| Diethyl-Malonate | 8 | 2,830 | 11.2 | 2¾ |
| Triethyl-Citrate | 6¼ | 2,820 | 10.8 | 2¼ |
| Diethyl-Succinate | 5¼ | 2,890 | 11.9 | 2¼ |

It is evident that in all cases the esters shortened the whipping time and the overbeaten samples gave improved cake volume as compared to the control. Comparable results are obtained with the corresponding methyl esters, for instance, trimethyl citrate, the partial esters of the mentioned acids such as monoethyl citrate and diethyl citrate and the mixed methyl-ethyl esters.

It has been found further that the overbeating tolerance of egg whites containing esters may be increased by the addition of an edible buffer salt capable of maintaining the pH of the egg whites at approximately 8.0. An example of such a buffer salt is mono-sodium acid phosphate. Egg whites having the normal pH of about 9 do not give as stable or stiff a foam as when the pH is reduced to around 8. When both an ester and a buffer salt are added full overbeating tolerance is obtained, that is, extra whipping does not result in a decrease in the cake volume.

The effect of the addition of 0.15% monosodium acid phosphate along with 0.025% triethyl citrate is shown in the following table:

|  | Normal | | Overbeaten | |
| --- | --- | --- | --- | --- |
|  | Control | Phosphate + Citrate | Control | Phosphate + Citrate |
| Cake Vol. (ml.) | 2,805 | 2,790 | 2,675 | 2,830 |
| Time, min | 5 | 3½ | 10 | 7 |
| pH | 9.1 | 8.1 |  |  |

It will be observed that the phosphate-citrate sample, although in an overbeaten condition, gave a higher cake volume than the control which was beaten to a normal extent.

Liquid egg whites having incorporated therewith the esters disclosed herein may be dried in the manner commonly practiced in the art. When the dried product is reconstituted with water substantially the same improvement in whipping properties is obtained as with undried egg whites. In the appended claims the term "egg white" is used to include both liquid and dry egg white.

I claim:

1. An egg white composition having improved whipping properties containing an edible unsulfonated appreciably water-soluble ester of an aliphatic alcohol having less than three carbon atoms and an aliphatic polybasic acid of the group consisting of tartaric, malic, malonic, citric and succinic acids.

2. A composition as claimed in claim 1 containing a buffer salt and having a pH of about 8.

3. An egg white composition having improved whipping properties containing an edible unsulfonated appreciably water-soluble ethyl ester of an aliphatic polybasic acid of the group consisting of tartaric, malic, malonic, citric and succinic acids.

4. An egg white composition having improved whipping properties containing an edible unsulfonated appreciably water-soluble methyl ester of an aliphatic polybasic acid of the group consisting of tartaric, malic, malonic, citric and succinic acids.

5. A composition as claimed in claim 3 containing a buffer salt and having a pH of about 8.

6. A composition as claimed in claim 4 containing a buffer salt and having a pH of about 8.

7. A composition as claimed in claim 3 wherein the ester is triethyl citrate.

8. A composition as claimed in claim 7 wherein the buffer salt is monosodium acid phosphate.

HERBERT J. KOTHE.

References Cited in the file of this patent

UNITED STATES PATENTS

| Number | Name | Date |
| --- | --- | --- |
| 1,431,156 | Geere et al. | Oct. 10, 1922 |
| 2,093,786 | Swarthout | Sept. 21, 1937 |
| 2,166,070 | Littlefield | July 11, 1939 |
| 2,183,516 | Mink | Dec. 12, 1939 |
| 2,485,638 | Gooding et al. | Oct. 25, 1949 |